US009922547B2

(12) United States Patent
Nathan

(10) Patent No.: US 9,922,547 B2
(45) Date of Patent: *Mar. 20, 2018

(54) REMOTE CONTROL UNIT FOR ACTIVATING AND DEACTIVATING MEANS FOR PAYMENT AND FOR DISPLAYING PAYMENT STATUS

(71) Applicant: TouchTunes Music Corporation, New York, NY (US)

(72) Inventor: Guy Nathan, Yerres (FR)

(73) Assignee: TouchTunes Music Corporation, New York, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/536,938

(22) Filed: Nov. 10, 2014

(65) Prior Publication Data
US 2015/0061823 A1 Mar. 5, 2015

Related U.S. Application Data

(63) Continuation of application No. 14/064,455, filed on Oct. 28, 2013, now Pat. No. 8,904,449, which is a
(Continued)

(30) Foreign Application Priority Data
Jul. 22, 1998 (FR) ..................... 98 09351

(51) Int. Cl.
*G01S 15/00* (2006.01)
*G08C 17/02* (2006.01)
(Continued)

(52) U.S. Cl.
CPC .......... *G08C 17/02* (2013.01); *G06Q 20/145* (2013.01); *G07F 17/30* (2013.01); *G07F 17/305* (2013.01);
(Continued)

(58) Field of Classification Search
None
See application file for complete search history.

(56) References Cited

U.S. PATENT DOCUMENTS 3,807,541 A    4/1974  Kortenhaus
3,890,592 A *  6/1975  Kitamura ............... H03G 1/02
                                                     367/197
(Continued)

FOREIGN PATENT DOCUMENTS

AU    199954012    4/2000
DE      3406058    8/1985
(Continued)

OTHER PUBLICATIONS

U.S. Appl. No. 08/817,426, filed Jan. 2002, 2002-0010788, Nathan et al., Audiovisual Distribution System.
(Continued)

*Primary Examiner* — Curtis King
(74) *Attorney, Agent, or Firm* — Nixon & Vanderhye, P.C.

(57) ABSTRACT

The invention relates to a remote control unit for intelligent digital audiovisual reproduction systems, comprising storage means, payment means, a sound control circuit, display means and a metal chassis wherein said remote control unit comprises a distant radio frequency transmitter that is associated with a radio frequency receiver connected to the sound control circuit of the audiovisual reproduction system.

15 Claims, 1 Drawing Sheet

Related U.S. Application Data continuation of application No. 13/195,168, filed on Aug. 1, 2011, now Pat. No. 8,677,424, which is a continuation of application No. 11/907,880, filed on Oct. 18, 2007, now Pat. No. 8,028,318, which is a continuation of application No. 09/357,764, filed on Jul. 21, 1999, now Pat. No. 7,293,277.

(51) Int. Cl.

| | | |
|---|---|---|
| *G07F 17/30* | (2006.01) | |
| *H04N 5/445* | (2011.01) | |
| *H04N 5/765* | (2006.01) | |
| *H04N 7/16* | (2011.01) | |
| *H04N 21/422* | (2011.01) | |
| *H04N 21/434* | (2011.01) | |
| *H04N 21/2543* | (2011.01) | |
| *G06Q 20/14* | (2012.01) | |
| *H04B 1/20* | (2006.01) | |
| *H04N 5/44* | (2011.01) | |
| *H04N 5/775* | (2006.01) | |
| *H04N 5/781* | (2006.01) | |

(52) U.S. Cl.
CPC ......... *H04N 5/44582* (2013.01); *H04N 5/765* (2013.01); *H04N 7/165* (2013.01); *H04N 21/2543* (2013.01); *H04N 21/42204* (2013.01); *H04N 21/4341* (2013.01); *G08C 2201/20* (2013.01); *H04B 1/202* (2013.01); *H04N 5/4401* (2013.01); *H04N 5/4403* (2013.01); *H04N 5/775* (2013.01); *H04N 5/781* (2013.01); *H04N 2005/4426* (2013.01); *H04N 2005/4435* (2013.01)

(56) References Cited

U.S. PATENT DOCUMENTS

| | | | |
|---|---|---|---|
| 3,982,620 A | 9/1976 | Kotenhaus | |
| 4,008,369 A | 2/1977 | Theurer et al. | |
| 4,186,438 A | 1/1980 | Benson | |
| 4,232,295 A | 11/1980 | McConnell | |
| 4,335,809 A | 6/1982 | Wain | |
| 4,335,908 A | 6/1982 | Burge | |
| 4,356,509 A | 10/1982 | Skerlos et al. | |
| 4,369,442 A | 1/1983 | Werth et al. | |
| 4,375,287 A | 3/1983 | Smith | |
| 4,412,292 A | 10/1983 | Sedam | |
| 4,413,260 A | 11/1983 | Siegel et al. | |
| 4,521,014 A | 6/1985 | Sitrick | |
| 4,528,643 A | 7/1985 | Freeny | |
| 4,558,413 A | 12/1985 | Schmidt et al. | |
| 4,572,509 A | 2/1986 | Sitrick | |
| 4,577,333 A | 3/1986 | Lewis et al. | |
| 4,582,324 A | 4/1986 | Koza | |
| 4,588,187 A | 5/1986 | Dell | |
| 4,593,904 A | 6/1986 | Graves | |
| 4,597,058 A | 6/1986 | Izumi | |
| 4,636,951 A | 1/1987 | Harlick | |
| 4,647,989 A * | 3/1987 | Geddes | G07F 17/305 194/906 |
| 4,652,998 A | 3/1987 | Koza | |
| 4,654,799 A | 3/1987 | Ogaki | |
| 4,658,093 A | 4/1987 | Hellman | |
| 4,667,802 A | 5/1987 | Verduin et al. | |
| 4,674,055 A | 6/1987 | Ogaki et al. | |
| 4,675,538 A | 6/1987 | Epstein | |
| 4,677,311 A | 6/1987 | Morita | |
| 4,677,565 A | 6/1987 | Ogaki | |
| 4,703,465 A | 10/1987 | Parker | |
| 4,704,725 A | 11/1987 | Harvey et al. | |
| 4,707,804 A | 11/1987 | Leal | |
| 4,722,053 A | 1/1988 | Dubno | |
| 4,761,684 A | 8/1988 | Clark | |
| 4,766,581 A | 8/1988 | Korn et al. | |
| 4,787,050 A | 11/1988 | Suzuki | |
| 4,792,849 A | 12/1988 | McCalley | |
| 4,807,052 A | 2/1989 | Amano | |
| 4,811,325 A | 3/1989 | Sharples | |
| 4,814,972 A | 3/1989 | Winter et al. | |
| 4,825,054 A | 4/1989 | Rust | |
| 4,829,570 A | 5/1989 | Schotz | |
| 4,852,154 A | 7/1989 | Lewis et al. | |
| 4,857,714 A | 8/1989 | Sunyich | |
| 4,868,832 A | 9/1989 | Marrington | |
| 4,885,694 A | 12/1989 | Pray et al. | |
| 4,905,279 A | 2/1990 | Nishio | |
| 4,920,432 A | 4/1990 | Eggers | |
| 4,922,420 A | 5/1990 | Nakagawa | |
| 4,924,378 A | 5/1990 | Hershey | |
| 4,926,485 A | 5/1990 | Yamashita | |
| 4,937,807 A | 6/1990 | Weitz | |
| 4,949,187 A | 8/1990 | Cohen | |
| 4,953,159 A | 8/1990 | Hayden et al. | |
| 4,956,768 A | 9/1990 | Sidi | |
| 4,958,835 A | 9/1990 | Tashiro | |
| 4,977,593 A | 12/1990 | Ballance | |
| 4,999,806 A | 3/1991 | Chernow | |
| 5,008,814 A | 4/1991 | Mathur | |
| 5,012,121 A | 4/1991 | Hammond | |
| 5,023,727 A * | 6/1991 | Boyd | G09B 5/065 348/476 |
| 5,027,426 A | 6/1991 | Chiocca | |
| 5,036,310 A * | 7/1991 | Russell | A47G 29/1214 340/531 |
| 5,041,921 A | 8/1991 | Scheffler | |
| 5,046,093 A | 9/1991 | Wachob | |
| 5,053,758 A | 10/1991 | Cornett et al. | |
| 5,058,089 A | 10/1991 | Yoshimara | |
| 5,077,607 A | 12/1991 | Johnson et al. | |
| 5,081,534 A | 1/1992 | Geiger et al. | |
| 5,101,499 A | 3/1992 | Streck et al. | |
| 5,106,097 A | 4/1992 | Levine | |
| 5,117,407 A | 5/1992 | Vogel | |
| 5,138,712 A | 8/1992 | Corbin | |
| 5,148,159 A | 9/1992 | Clark et al. | |
| 5,155,847 A | 10/1992 | Kirouac | |
| 5,159,678 A | 10/1992 | Wengelski et al. | |
| 5,163,131 A | 11/1992 | Row | |
| 5,166,886 A | 11/1992 | Molnar | |
| 5,172,413 A | 12/1992 | Bradley et al. | |
| 5,180,309 A | 1/1993 | Egnor | |
| 5,189,630 A | 2/1993 | Barstow et al. | |
| 5,191,573 A | 3/1993 | Hair | |
| 5,191,611 A | 3/1993 | Lang | |
| 5,192,999 A | 3/1993 | Graczyk | |
| 5,197,094 A | 3/1993 | Tillery | |
| 5,203,028 A | 4/1993 | Shiraishi | |
| 5,210,854 A | 5/1993 | Beaverton et al. | |
| 5,214,761 A | 5/1993 | Barrett et al. | |
| 5,222,134 A | 6/1993 | Waite et al. | |
| 5,228,015 A | 7/1993 | Arbiter et al. | |
| 5,237,157 A | 8/1993 | Kaplan | |
| 5,237,322 A | 8/1993 | Heberle | |
| 5,239,480 A | 8/1993 | Huegel | |
| 5,250,747 A | 10/1993 | Tsumura | |
| 5,252,775 A | 10/1993 | Urano | |
| 5,260,999 A | 11/1993 | Wyman | |
| 5,261,104 A | 11/1993 | Bertram et al. | |
| 5,262,875 A | 11/1993 | Mincer et al. | |
| 5,276,866 A | 1/1994 | Paolini | |
| 5,278,904 A | 1/1994 | Servi | |
| 5,282,028 A * | 1/1994 | Johnson | H03J 1/0025 348/E5.108 |
| 5,289,476 A | 2/1994 | Johnson et al. | |
| 5,289,546 A | 2/1994 | Hetherington | |
| 5,315,161 A | 5/1994 | Robinson | |
| 5,315,711 A | 5/1994 | Barone et al. | |
| 5,319,455 A * | 6/1994 | Hoarty | H04N 7/173 348/E5.105 |
| 5,321,846 A | 6/1994 | Yokota et al. | |
| 5,327,230 A | 7/1994 | Dockery | |
| 5,335,313 A | 8/1994 | Douglas | |

(56) References Cited

U.S. PATENT DOCUMENTS

| | | | |
|---|---|---|---|
| 5,339,095 A | 8/1994 | Redford | |
| 5,339,413 A | 8/1994 | Koval | |
| 5,341,350 A | 8/1994 | Frank | |
| 5,355,302 A * | 10/1994 | Martin | G06Q 20/1235 700/234 |
| 5,357,276 A | 10/1994 | Banker | |
| 5,364,108 A * | 11/1994 | Esnouf | A63F 9/183 273/432 |
| 5,369,778 A | 11/1994 | SanSoucie | |
| 5,375,206 A | 12/1994 | Hunter | |
| 5,382,970 A * | 1/1995 | Kiefl | H04H 60/40 348/E7.072 |
| 5,383,044 A * | 1/1995 | Borchardt | H04B 10/114 340/12.5 |
| 5,386,251 A | 1/1995 | Movshovich | |
| 5,389,950 A | 2/1995 | Martin et al. | |
| 5,404,505 A | 4/1995 | Levinson | |
| 5,406,634 A | 4/1995 | Anderson et al. | |
| 5,408,417 A | 4/1995 | Wilder | |
| 5,410,326 A | 4/1995 | Goldstein | |
| 5,410,703 A | 4/1995 | Nilsson et al. | |
| 5,414,808 A * | 5/1995 | Williams | G06F 17/30017 348/575 |
| 5,418,713 A | 5/1995 | Allen | |
| 5,420,923 A | 5/1995 | Beyers | |
| 5,428,252 A | 6/1995 | Walker | |
| 5,428,606 A | 6/1995 | Moskowitz | |
| 5,431,492 A | 7/1995 | Rothschild | |
| 5,440,632 A | 8/1995 | Bacon et al. | |
| 5,444,499 A | 8/1995 | Saitoh | |
| 5,445,295 A | 8/1995 | Brown | |
| 5,455,619 A | 10/1995 | Truckenmiller et al. | |
| 5,455,926 A | 10/1995 | Keele | |
| 5,457,305 A | 10/1995 | Akel | |
| 5,465,213 A | 11/1995 | Ross | |
| 5,467,326 A | 11/1995 | Miyashita et al. | |
| 5,469,370 A | 11/1995 | Ostrover et al. | |
| 5,469,573 A | 11/1995 | McGill et al. | |
| 5,471,576 A | 11/1995 | Yee | |
| 5,473,746 A | 12/1995 | Pritt et al. | |
| 5,475,835 A | 12/1995 | Hickey | |
| 5,481,509 A | 1/1996 | Knowles | |
| 5,487,167 A | 1/1996 | Dinallo et al. | |
| 5,489,103 A | 2/1996 | Okamoto | |
| 5,495,610 A | 2/1996 | Shing et al. | |
| 5,496,178 A | 3/1996 | Back | |
| 5,499,921 A | 3/1996 | Sone | |
| 5,511,000 A | 4/1996 | Kaloi et al. | |
| 5,513,117 A | 4/1996 | Small | |
| 5,515,173 A | 5/1996 | Mankovitz et al. | |
| 5,519,435 A | 5/1996 | Anderson | |
| 5,519,457 A | 5/1996 | Nishigaki et al. | |
| 5,521,631 A | 5/1996 | Budow et al. | |
| 5,521,918 A | 5/1996 | Kim | |
| 5,521,922 A | 5/1996 | Fujinami et al. | |
| 5,523,781 A | 6/1996 | Brusaw | |
| 5,528,732 A | 6/1996 | Klotz | |
| 5,532,734 A | 7/1996 | Goertz | |
| 5,532,991 A | 7/1996 | Sasaki | |
| 5,543,776 A * | 8/1996 | L'Esperance | B60R 25/1003 180/287 |
| 5,546,039 A | 8/1996 | Hewitt et al. | |
| 5,548,729 A | 8/1996 | Akiyoshi | |
| 5,550,577 A | 8/1996 | Verbiest | |
| 5,554,968 A | 9/1996 | Lee | |
| 5,555,244 A | 9/1996 | Gupta | |
| 5,557,541 A | 9/1996 | Schulhof | |
| 5,557,724 A | 9/1996 | Sampat et al. | |
| 5,559,505 A | 9/1996 | McNair | |
| 5,559,549 A | 9/1996 | Hendricks | |
| 5,559,714 A | 9/1996 | Banks et al. | |
| 5,561,709 A | 10/1996 | Remillard | |
| 5,565,908 A | 10/1996 | Ahmad | |
| 5,566,237 A | 10/1996 | Dobbs | |
| 5,570,363 A | 10/1996 | Holm | |
| 5,578,999 A | 11/1996 | Matsuzawa et al. | |
| 5,579,404 A | 11/1996 | Fielder et al. | |
| 5,583,561 A | 12/1996 | Baker et al. | |
| 5,583,937 A | 12/1996 | Ullrich et al. | |
| 5,583,994 A | 12/1996 | Rangan | |
| 5,583,995 A | 12/1996 | Gardner et al. | |
| 5,592,482 A | 1/1997 | Abraham | |
| 5,592,551 A | 1/1997 | Lett | |
| 5,592,611 A | 1/1997 | Midgely et al. | |
| 5,594,509 A | 1/1997 | Florin | |
| 5,596,702 A | 1/1997 | Stucka et al. | |
| 5,612,581 A | 3/1997 | Kageyama | |
| 5,613,909 A | 3/1997 | Stelovsky | |
| 5,616,876 A | 4/1997 | Cluts | |
| 5,617,565 A | 4/1997 | Augenbraun et al. | |
| 5,619,247 A * | 4/1997 | Russo | G06Q 20/145 348/E7.07 |
| 5,619,249 A | 4/1997 | Billock et al. | |
| 5,619,250 A | 4/1997 | McClellan et al. | |
| 5,619,698 A | 4/1997 | Lillich | |
| 5,623,666 A | 4/1997 | Pike | |
| 5,625,608 A * | 4/1997 | Grewe | H01H 9/0235 340/12.54 |
| 5,631,693 A | 5/1997 | Wunderlich et al. | |
| 5,636,276 A | 6/1997 | Brugger | |
| 5,638,426 A | 6/1997 | Lewis | |
| 5,642,337 A | 6/1997 | Oskay et al. | |
| 5,644,714 A | 7/1997 | Kikinis | |
| 5,644,766 A | 7/1997 | Coy | |
| 5,650,831 A * | 7/1997 | Farwell | H04N 5/44582 340/12.5 |
| 5,654,714 A | 8/1997 | Takahashi et al. | |
| 5,659,466 A | 8/1997 | Norris et al. | |
| 5,661,517 A | 8/1997 | Budow et al. | |
| 5,661,802 A | 8/1997 | Nilssen | |
| 5,663,756 A | 9/1997 | Blahut et al. | |
| 5,668,592 A | 9/1997 | Spaulding | |
| 5,668,778 A | 9/1997 | Quazi | |
| 5,668,788 A | 9/1997 | Allison | |
| 5,675,734 A | 10/1997 | Hair | |
| 5,680,533 A | 10/1997 | Yamato et al. | |
| 5,684,716 A | 11/1997 | Freeman | |
| 5,689,641 A | 11/1997 | Ludwig et al. | |
| 5,691,778 A | 11/1997 | Song | |
| 5,691,964 A | 11/1997 | Niederlein et al. | |
| 5,696,914 A | 12/1997 | Nahaboo et al. | |
| 5,697,844 A | 12/1997 | Von Kohorn | |
| 5,703,795 A | 12/1997 | Mankowitz | |
| 5,708,811 A | 1/1998 | Arendt | |
| 5,712,976 A | 1/1998 | Falcon et al. | |
| 5,713,024 A | 1/1998 | Halladay | |
| 5,715,416 A | 2/1998 | Baker | |
| 5,717,452 A | 2/1998 | Janin et al. | |
| 5,721,583 A | 2/1998 | Harada et al. | |
| 5,721,815 A | 2/1998 | Ottesen et al. | |
| 5,721,827 A | 2/1998 | Logan et al. | |
| 5,721,829 A | 2/1998 | Dunn et al. | |
| 5,724,525 A | 3/1998 | Beyers et al. | |
| 5,726,909 A | 3/1998 | Krikorian | |
| 5,734,719 A | 3/1998 | Tsevdos et al. | |
| 5,734,961 A | 3/1998 | Castille | |
| 5,739,451 A | 4/1998 | Winksy et al. | |
| 5,742,893 A * | 4/1998 | Frank | H04H 20/62 455/3.05 |
| 5,743,745 A | 4/1998 | Reintjes | |
| 5,745,391 A | 4/1998 | Topor | |
| 5,748,254 A | 5/1998 | Harrison et al. | |
| 5,748,468 A | 5/1998 | Notenboom et al. | |
| 5,748,954 A | 5/1998 | Mauldin | |
| 5,751,336 A | 5/1998 | Aggarwal et al. | |
| 5,752,232 A | 5/1998 | Basore et al. | |
| 5,757,936 A | 5/1998 | Lee | |
| 5,758,340 A | 5/1998 | Nail | |
| 5,761,655 A | 6/1998 | Hoffman | |
| 5,762,552 A | 6/1998 | Vuong | |
| 5,774,527 A | 6/1998 | Handelman et al. | |
| 5,774,668 A | 6/1998 | Choqiuer | |
| 5,774,672 A | 6/1998 | Funahashi | |

(56) References Cited

U.S. PATENT DOCUMENTS

| | | |
|---|---|---|
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A * | 3/1999 | Smith, II .............. G11B 27/002 |
| 5,887,139 A | 3/1999 | Madison, Jr. et al. |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A * | 7/1999 | Petite ..................... G06Q 20/02<br>235/382 |
| 5,926,624 A | 7/1999 | Katz et al. |
| 5,930,765 A * | 7/1999 | Martin ............... G06Q 30/0209<br>463/42 |
| 5,931,908 A | 8/1999 | Gerba |
| 5,933,090 A | 8/1999 | Christenson |
| 5,940,007 A * | 8/1999 | Brinkmeyer ............ B60R 25/00<br>307/10.7 |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,704 A * | 10/1999 | Mimura ............... H04N 9/8227<br>348/E5.099 |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,993,220 A * | 11/1999 | Nakamura ............. G10H 1/363<br>340/12.22 |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,147,935 A * | 11/2000 | Guyett ..................... G04G 19/10<br>368/204 |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 * | 1/2001 | Nathan ............... G06F 3/04847<br>348/E7.073 |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,198,513 B1 * | 3/2001 | Cherrick ............ H04N 5/44513<br>348/731 |
| 6,202,060 B1 | 3/2001 | Tran |
| 6,208,802 B1 * | 3/2001 | Mori ..................... G11B 19/02<br>386/253 |
| 6,209,060 B1 | 3/2001 | Machida |
| 6,212,138 B1 * | 4/2001 | Kalis ..................... G07F 17/305<br>360/73.03 |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |

(56) References Cited

U.S. PATENT DOCUMENTS

| | | | |
|---|---|---|---|
| 6,286,140 B1 * | 9/2001 | Ivanyi | H04H 60/33 348/E5.096 |
| 6,288,688 B1 | 9/2001 | Hughes et al. | |
| 6,288,991 B1 | 9/2001 | Kajiyama et al. | |
| 6,289,382 B1 | 9/2001 | Bowman-Amuah | |
| 6,292,443 B1 | 9/2001 | Awazu et al. | |
| 6,298,373 B1 | 10/2001 | Burns et al. | |
| 6,301,710 B1 | 10/2001 | Fujiwara | |
| 6,302,793 B1 | 10/2001 | Fertitta et al. | |
| 6,308,204 B1 * | 10/2001 | Nathan | G07F 17/305 348/E7.073 |
| 6,311,214 B1 | 10/2001 | Rhoads | |
| 6,315,572 B1 | 11/2001 | Glaser | |
| 6,323,911 B1 | 11/2001 | Schein et al. | |
| 6,332,025 B2 | 12/2001 | Takahashi et al. | |
| 6,336,219 B1 | 1/2002 | Nathan | |
| 6,341,166 B1 | 1/2002 | Basel | |
| 6,344,862 B1 | 2/2002 | Williams et al. | |
| 6,346,951 B1 | 2/2002 | Mastronardi | |
| 6,353,820 B1 | 3/2002 | Edwards et al. | |
| 6,356,971 B1 | 3/2002 | Katz et al. | |
| 6,359,616 B1 | 3/2002 | Ogura et al. | |
| 6,359,636 B1 * | 3/2002 | Schindler | G06F 3/0481 348/E7.071 |
| 6,359,661 B1 | 3/2002 | Nickum | |
| 6,370,580 B2 | 4/2002 | Kriegsman | |
| 6,381,575 B1 | 4/2002 | Martin et al. | |
| 6,384,737 B1 | 5/2002 | Hsu et al. | |
| 6,393,584 B1 | 5/2002 | McLaren et al. | |
| 6,396,480 B1 | 5/2002 | Schindler et al. | |
| 6,397,189 B1 | 5/2002 | Martin et al. | |
| 6,407,987 B1 | 6/2002 | Abraham | |
| 6,408,435 B1 | 6/2002 | Sato | |
| 6,408,437 B1 | 6/2002 | Hendricks et al. | |
| 6,421,651 B1 | 7/2002 | Tedesco et al. | |
| 6,425,125 B1 | 7/2002 | Fries et al. | |
| 6,430,537 B1 | 8/2002 | Tedesco et al. | |
| 6,430,738 B1 | 8/2002 | Gross et al. | |
| 6,434,678 B1 | 8/2002 | Menzel | |
| 6,438,450 B1 | 8/2002 | DiLorenzo | |
| 6,442,549 B1 | 8/2002 | Schneider | |
| 6,446,130 B1 | 9/2002 | Grapes | |
| 6,449,688 B1 | 9/2002 | Peters et al. | |
| 6,470,496 B1 | 10/2002 | Kato et al. | |
| 6,473,794 B1 | 10/2002 | Guheen et al. | |
| 6,488,508 B2 | 12/2002 | Okamoto | |
| 6,490,570 B1 | 12/2002 | Numaoka | |
| 6,493,871 B1 | 12/2002 | McGuire et al. | |
| 6,496,927 B1 | 12/2002 | McGrane et al. | |
| 6,498,855 B1 | 12/2002 | Kokkosoulis et al. | |
| 6,522,707 B1 | 2/2003 | Brandstetter et al. | |
| 6,535,911 B1 | 3/2003 | Miller et al. | |
| 6,538,558 B2 | 3/2003 | Sakazume et al. | |
| 6,543,052 B1 | 4/2003 | Ogasawara | |
| 6,544,122 B2 | 4/2003 | Araki et al. | |
| 6,549,719 B2 | 4/2003 | Mankovitz | |
| 6,560,651 B2 | 5/2003 | Katz et al. | |
| 6,570,507 B1 | 5/2003 | Lee et al. | |
| 6,571,282 B1 | 5/2003 | Bowman-Amuah | |
| 6,577,735 B1 | 6/2003 | Bharat | |
| 6,578,051 B1 | 6/2003 | Mastronardi et al. | |
| 6,587,403 B1 * | 7/2003 | Keller | G11B 17/22 369/30.05 |
| 6,590,838 B1 | 7/2003 | Gerlings et al. | |
| 6,598,230 B1 | 7/2003 | Ballhorn | |
| 6,622,307 B1 | 9/2003 | Ho | |
| 6,628,939 B2 | 9/2003 | Paulsen | |
| 6,629,318 B1 | 9/2003 | Radha et al. | |
| 6,643,620 B1 | 11/2003 | Contolini et al. | |
| 6,643,690 B2 | 11/2003 | Duursma et al. | |
| 6,647,256 B1 * | 11/2003 | Stewen | G06Q 20/12 370/315 |
| 6,654,801 B2 | 11/2003 | Mann et al. | |
| 6,658,090 B1 | 12/2003 | Harjunen et al. | |
| 6,662,231 B1 | 12/2003 | Drosset et al. | |
| 6,702,585 B2 | 3/2004 | Okamoto | |
| 6,724,974 B2 | 4/2004 | Naruto et al. | |
| 6,728,824 B1 | 4/2004 | Chen | |
| 6,728,956 B2 | 4/2004 | Ono | |
| 6,728,966 B1 | 4/2004 | Arsenault et al. | |
| 6,744,882 B1 | 6/2004 | Gupta et al. | |
| 6,751,794 B1 | 6/2004 | McCaleb et al. | |
| 6,755,744 B1 | 6/2004 | Nathan et al. | |
| 6,762,585 B2 | 7/2004 | Liao | |
| 6,789,215 B1 | 9/2004 | Rupp et al. | |
| 6,816,578 B1 | 11/2004 | Kredo et al. | |
| 6,898,161 B1 | 5/2005 | Nathan | |
| 6,904,592 B1 | 6/2005 | Johnson | |
| 6,920,614 B1 | 7/2005 | Schindler et al. | |
| 6,928,653 B1 | 8/2005 | Ellis et al. | |
| 6,934,700 B1 | 8/2005 | Ijdens et al. | |
| 6,942,574 B1 | 9/2005 | LeMay et al. | |
| 6,974,076 B1 | 12/2005 | Siegel | |
| 7,024,485 B2 | 4/2006 | Dunning et al. | |
| 7,073,172 B2 | 7/2006 | Chamberlain | |
| 7,103,583 B1 | 9/2006 | Baum et al. | |
| 7,107,109 B1 | 9/2006 | Nathan et al. | |
| 7,111,129 B2 | 9/2006 | Percival | |
| 7,114,013 B2 | 9/2006 | Bakke et al. | |
| 7,124,194 B2 | 10/2006 | Nathan et al. | |
| 7,188,352 B2 | 3/2007 | Nathan et al. | |
| 7,195,157 B2 | 3/2007 | Swartz et al. | |
| 7,198,571 B2 | 4/2007 | LeMay et al. | |
| 7,205,471 B2 | 4/2007 | Looney et al. | |
| 7,206,417 B2 | 4/2007 | Nathan | |
| 7,210,141 B1 | 4/2007 | Nathan et al. | |
| 7,231,656 B1 | 6/2007 | Nathan | |
| 7,237,198 B1 | 6/2007 | Chaney | |
| 7,281,652 B2 | 10/2007 | Foss | |
| 7,293,277 B1 | 11/2007 | Nathan | |
| 7,356,831 B2 | 4/2008 | Nathan | |
| 7,406,529 B2 | 7/2008 | Reed | |
| 7,415,707 B2 | 8/2008 | Taguchi et al. | |
| 7,418,474 B2 | 8/2008 | Schwab | |
| 7,424,731 B1 | 9/2008 | Nathan et al. | |
| 7,430,736 B2 | 9/2008 | Nguyen et al. | |
| 7,433,832 B1 | 10/2008 | Bezos et al. | |
| 7,448,057 B1 | 11/2008 | Nathan | |
| 7,483,958 B1 | 1/2009 | Elabbady et al. | |
| 7,500,192 B2 | 3/2009 | Mastronardi | |
| 7,512,632 B2 | 3/2009 | Mastronardi et al. | |
| 7,519,442 B2 | 4/2009 | Nathan et al. | |
| 7,533,182 B2 | 5/2009 | Wurtzel et al. | |
| 7,549,919 B1 | 6/2009 | Nathan et al. | |
| 7,574,727 B2 | 8/2009 | Nathan et al. | |
| 7,647,613 B2 | 1/2010 | Drakoulis et al. | |
| 7,657,910 B1 | 2/2010 | McAulay et al. | |
| 7,749,083 B2 | 7/2010 | Nathan et al. | |
| 7,757,264 B2 | 7/2010 | Nathan | |
| 7,761,538 B2 | 7/2010 | Lin et al. | |
| 7,770,165 B2 | 8/2010 | Olson et al. | |
| 7,778,879 B2 | 8/2010 | Nathan et al. | |
| 7,783,593 B2 | 8/2010 | Espino | |
| 7,783,774 B2 | 8/2010 | Nathan et al. | |
| 7,793,331 B2 | 9/2010 | Nathan et al. | |
| 7,819,734 B2 | 10/2010 | Nathan et al. | |
| 7,822,687 B2 | 10/2010 | Brillon et al. | |
| 8,028,318 B2 | 9/2011 | Nathan | |
| 8,677,424 B2 | 3/2014 | Nathan | |
| 2001/0016815 A1 | 8/2001 | Takahashi et al. | |
| 2001/0023403 A1 | 9/2001 | Martin et al. | |
| 2001/0030660 A1 | 10/2001 | Zainoulline | |
| 2001/0037367 A1 | 11/2001 | Iyer | |
| 2001/0044725 A1 | 11/2001 | Matsuda et al. | |
| 2002/0002079 A1 | 1/2002 | Martin et al. | |
| 2002/0002483 A1 | 1/2002 | Siegel et al. | |
| 2002/0113824 A1 | 8/2002 | Myers | |
| 2002/0116476 A1 | 8/2002 | Eyal et al. | |
| 2002/0118949 A1 | 8/2002 | Jones et al. | |
| 2002/0120925 A1 | 8/2002 | Logan | |
| 2002/0126141 A1 | 9/2002 | Mastronardi | |
| 2002/0129036 A1 | 9/2002 | Ho Yuen Lok et al. | |

(56) References Cited

U.S. PATENT DOCUMENTS

| | | | |
|---|---|---|---|
| 2002/0147688 A1* | 10/2002 | Arai | G06F 17/30017 705/52 |
| 2002/0162104 A1 | 10/2002 | Raike et al. | |
| 2003/0005099 A1 | 1/2003 | Sven et al. | |
| 2003/0006911 A1 | 1/2003 | Smith et al. | |
| 2003/0008703 A1 | 1/2003 | Gauselmann | |
| 2003/0018740 A1 | 1/2003 | Sonoda et al. | |
| 2003/0031096 A1 | 2/2003 | Nathan et al. | |
| 2003/0041093 A1 | 2/2003 | Yamane et al. | |
| 2003/0065639 A1 | 4/2003 | Fiennes et al. | |
| 2003/0088538 A1 | 5/2003 | Ballard | |
| 2003/0093790 A1 | 5/2003 | Logan et al. | |
| 2003/0101450 A1 | 5/2003 | Davidsson et al. | |
| 2003/0104865 A1 | 6/2003 | Itkis et al. | |
| 2003/0108164 A1 | 6/2003 | Laurin et al. | |
| 2003/0135424 A1 | 7/2003 | Davis et al. | |
| 2003/0191753 A1 | 10/2003 | Hoch | |
| 2003/0208586 A1 | 11/2003 | Mastronardi et al. | |
| 2003/0225834 A1 | 12/2003 | Lee et al. | |
| 2003/0228881 A1* | 12/2003 | Yamamoto | G06F 3/0338 455/550.1 |
| 2004/0025185 A1 | 2/2004 | Goci et al. | |
| 2004/0085334 A1 | 5/2004 | Reaney | |
| 2004/0103150 A1 | 5/2004 | Ogdon et al. | |
| 2004/0204220 A1 | 10/2004 | Fried et al. | |
| 2004/0205171 A1 | 10/2004 | Nathan et al. | |
| 2004/0220926 A1 | 11/2004 | Lamkin et al. | |
| 2005/0060405 A1 | 3/2005 | Nathan et al. | |
| 2005/0073782 A1 | 4/2005 | Nathan | |
| 2005/0086172 A1 | 4/2005 | Stefik | |
| 2005/0125833 A1 | 6/2005 | Nathan et al. | |
| 2005/0267819 A1 | 12/2005 | Kaplan | |
| 2006/0018208 A1 | 1/2006 | Nathan et al. | |
| 2006/0035707 A1 | 2/2006 | Nguyen et al. | |
| 2006/0062094 A1 | 3/2006 | Nathan et al. | |
| 2006/0074985 A1* | 4/2006 | Wolfish | G06Q 20/322 |
| 2006/0104046 A1* | 5/2006 | Guzman | A43B 3/0005 362/103 |
| 2006/0121982 A1* | 6/2006 | Martin | G07F 17/3295 463/25 |
| 2006/0227673 A1 | 10/2006 | Yamashita et al. | |
| 2006/0239131 A1 | 10/2006 | Nathan et al. | |
| 2006/0293773 A1 | 12/2006 | Nathan et al. | |
| 2007/0086280 A1 | 4/2007 | Cappello et al. | |
| 2007/0121430 A1 | 5/2007 | Nathan | |
| 2007/0142022 A1 | 6/2007 | Madonna et al. | |
| 2007/0160224 A1 | 7/2007 | Nathan | |
| 2007/0204263 A1 | 8/2007 | Nathan et al. | |
| 2007/0209053 A1 | 9/2007 | Nathan | |
| 2007/0247979 A1 | 10/2007 | Brillon et al. | |
| 2008/0069545 A1 | 3/2008 | Nathan et al. | |
| 2008/0077962 A1 | 3/2008 | Nathan | |
| 2008/0086379 A1 | 4/2008 | Dion et al. | |
| 2008/0096659 A1 | 4/2008 | Kreloff et al. | |
| 2008/0137849 A1 | 6/2008 | Nathan | |
| 2008/0155588 A1 | 6/2008 | Roberts et al. | |
| 2008/0168807 A1 | 7/2008 | Dion et al. | |
| 2008/0171594 A1 | 7/2008 | Fedesna et al. | |
| 2008/0195443 A1 | 8/2008 | Nathan et al. | |
| 2008/0239887 A1 | 10/2008 | Tooker et al. | |
| 2009/0037969 A1 | 2/2009 | Nathan et al. | |
| 2009/0070341 A1 | 3/2009 | Mastronardi et al. | |
| 2009/0138111 A1 | 5/2009 | Mastronardi | |
| 2009/0172565 A1 | 7/2009 | Jackson et al. | |
| 2009/0265734 A1 | 10/2009 | Dion et al. | |
| 2009/0282491 A1 | 11/2009 | Nathan | |
| 2010/0042505 A1 | 2/2010 | Straus | |
| 2010/0211818 A1 | 8/2010 | Nathan et al. | |
| 2010/0241259 A1 | 9/2010 | Nathan | |
| 2010/0269066 A1 | 10/2010 | Nathan | |
| 2010/0299232 A1 | 11/2010 | Nathan et al. | |
| 2011/0066943 A1 | 3/2011 | Brillon et al. | |
| 2014/0053172 A1 | 2/2014 | Nathan | |

FOREIGN PATENT DOCUMENTS

| | | |
|---|---|---|
| DE | 3723737 | 1/1988 |
| DE | 3820835 | 1/1989 |
| DE | 3815071 | 11/1989 |
| DE | 4244198 | 6/1994 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 8274812 | 10/1996 |
| JP | 08279235 | 10/1996 |
| JP | 9114470 | 5/1997 |
| JP | 9127964 | 5/1997 |
| JP | 10-098344 | 4/1998 |
| JP | 10222537 | 8/1998 |
| JP | 07504517 | 3/2007 |
| WO | WO 86/01326 | 2/1986 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 94/03894 | 2/1994 |
| WO | WO 94/14273 | 6/1994 |
| WO | WO 94/15306 | 7/1994 |
| WO | WO 94/15416 | 7/1994 |

(56) References Cited

FOREIGN PATENT DOCUMENTS

| WO | WO 95/03609 | 2/1995 |
|---|---|---|
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 02/095752 | 11/2002 |
| WO | WO 03/069613 | 8/2003 |
| WO | WO 2004/029775 | 4/2004 |
| WO | WO 2006/014739 | 2/2006 |

OTHER PUBLICATIONS

U.S. Appl. No. 08/817,438, filed Oct. 2, 1997, System for Distributing and Selecting Audio and Video Information and Method Implemented by Said System.
U.S. Appl. No. 08/817,690, filed Feb. 2002, Nathan et al., 2002-0016968, Intelligent Digital Audiovisual Playback System.
U.S. Appl. No. 08/817,968, filed Oct. 2, 1997, Intelligent Digital Audiovisual Playback System.
U.S. Appl. No. 09/161,584, filed Sep. 28, 1998, Wireless Digital Transmission System for Loudspeakers.
U.S. Appl. No. 09/253,734, filed Feb. 22, 1999, Intellegent Digital Audiovisual Playback System.
U.S. Appl. No. 09/290,999, filed Apr. 14, 1999, Device and Process for Supplying Backed-Up Electric Power for an Audiovisual System.
U.S. Appl. No. 09/583,863, filed Aug. 2011, now U.S. Pat. No. 7,992,178, Nathan et al., Downloading File Reception Process.
U.S. Appl. No. 09/584,797, filed Aug. 2011, now U.S. Pat. No. 7,996,873, Nathan et al., Remote Management System for At Least One Audiovisual Information Reproduction Device.
U.S. Appl. No. 09/585,325, filed Jun. 2, 2000, Process for Ordering a Selection in Advance, Digital System and Jukebox for Embodiment of the Process.
U.S. Appl. No. 09/621,677, filed Dec. 2011, now U.S. Pat. No. 8,074,253, Nathan, Audiovisual Reproduction System.
U.S. Appl. No. 09/642,928, filed Sep. 2008, now U.S. Pat. No. 7,424,731, Nathan et al., Home Digital Audiovisual Information Recording and Playback System.
U.S. Appl. No. 09/664,494, filed Sep. 18, 2000, Method for the Distribution of Audiovisual Information and System for the Distribution of Audiovisual Information.
U.S. Appl. No. 10/196,258, filed Oct. 2011, now U.S. Pat. No. 8,037,412, Nathan et al., Pay-Per-Play Audiovisual System With Touch Screen Interface.
U.S. Appl. No. 10/965,742, filed May 2012, now U.S. Pat. No. 8,189,819, Nathan, Sound Control Circuit for a Digital Audiovisual Reproduction System.
U.S. Appl. No. 11/035,882, filed Feb. 2014, now U.S. Pat. No. 8,661,477, Nathan et al., System for Distributing and Selecting Audio and Video Information and Method Implementing By Said System.
U.S. Appl. No. 10/185,974, filed Jan. 2012, now U.S. Pat. No. 8,103,589, Nathan et al., Digital Downloading Jukebox System with Central and Local Music Servers.
U.S. Appl. No. 11/222,036, filed Apr. 2012, now U.S. Pat. No. 8,151,304, Nathan et al., Digital Downloading Jukebox System with User-Tailored Music Management, Communications, and Other Tools.
U.S. Appl. No. 11/358,721, filed Dec. 2012, now U.S. Pat. No. 8,332,895, Nathan et al., Digital Downloading Jukebox System with user-Tailored Music Management, Communications, and Other Tools.
U.S. Appl. No. 11/513,018, filed Apr. 2012, now U.S. Pat. No. 8,165,318, Nathan et al., Process for Adjusting the Sound Volume of a Digital Sound Recording.
U.S. Appl. No. 11/698,060, filed May 2012, now U.S. Pat. No. 8,184,508, Nathan et al., Intelligent Digital Audiovidual Playback System.
U.S. Appl. No. 11/714,868, filed Apr. 2013, now U.S. Pat. No. 8,428,273, Nathan, Wireless Digital Transmission System for Loudspeakers.
U.S. Appl. No. 11/730,449, filed Oct. 2011, now U.S. Pat. No. 8,032,879, Nathan et al., System for Remote Loading of Objects or Files in Order to Update Software.
U.S. Appl. No. 11/979,179, filed Jul. 2012, now U.S. Pat. No. 8,225,369, Nathan et al., Home Digital Audiovisual Information Recording and Playback System.
U.S. Appl. No. 12/071,003, filed Jul. 2012, now U.S. Pat. No. 8,214,874, Nathan, Method for the Distribution of Audiovisual Information and a System for the Distribution of Audiovisual Information.
U.S. Appl. No. 12/230,254, filed Aug. 2011, now U.S. Pat. No. 7,996,438, Mastronardi et al., Device and Process for Remote Management of a Network of Audiovisual Information Reproduction Systems.
U.S. Appl. No. 12/232,869, filed Feb. 2012, now U.S. Pat. No. 8,127,324, Nathan, Audiovisual Reproduction System.
U.S. Appl. No. 12/318,864, filed Dec. 2012, now U.S. Pat. No. 8,332,887, Dion et al., Systems and/or Methods for Distributing Advertisements from a Central Advertisement Network to a Peripheral Device via a Local Advertisement Server.
U.S. Appl. No. 12/458,372, filed May 2014, now U.S. Pat. No. 8,726,330, Nathan et al., Intelligent Digital Audiovisual Playback System.
U.S. Appl. No. 12/662,639, filed Jul. 2011, now U.S. Pat. No. 7,897,282, Nathan et al., An Audiovisual Distribution System for Playing an Audiovisual Piece Among a Plurality of Audiovisual Devices Connected to a Central Server Through a Network.
U.S. Appl. No. 12/737,395, filed Jun. 2012, 2012-0260614, Dion et al., Digital Downloading Jukebox with Revenue-Enhancing Features.
U.S. Appl. No. 12/801,119, filed Jun. 2013, now U.S. Pat. No. 8,469,820, Nathan et al., Communication Device and Method Between an Audiovisual Information Playback System and an Electronic Game Machine.
U.S. Appl. No. 12/801,272, filed Sep. 2010, 2010-0251259, Nathan, Audiovisual Reproduction System.
U.S. Appl. No. 12/801,744, filed Sep. 2012, now U.S. Pat. No. 8,275,668, Nathan, Process for Ordering a Selection in Advance, Digital System and Jukebox for Embodiment of the Process.
U.S. Appl. No. 12/805,437, filed Mar. 2012, now U.S. Pat. No. 8,145,547, Nathan et al., Method of Communication for an Intelligent Digital Audiovisual Playback System.
U.S. Appl. No. 12/805,992, filed Jun. 2013, now U.S. Pat. No. 8,473,416, Brillon et al., Jukebox with Customizable Avatar.
U.S. Appl. No. 12/923,426, filed Nov. 2011, now U.S. Pat. No. 8,052,512, Nathan et al., Jukebox Entertainment System Having Multiple Choice Games Relating to Music.
U.S. Appl. No. 12/929,466, filed Nov. 2011, 2011-0283236, Beaumier et al., Digital Jukebox Device with Improved User Interfaces, and Associated Methods.
U.S. Appl. No. 13/100,715, filed May 2014, now U.S. Pat. No. 8,724,436, Nathan et al., Audiovisual Distribution System for Playing an Audiovisual Piece Among a Plurality of Audiovisual Devices Connected to a Central Server Through a Network.
U.S. Appl. No. 13/151,771, filed Jul. 2013, now U.S. Pat. No. 8,479,240, Nathan et al., Remote Management System for At Least One Audiovisual Information Reproduction Device.
U.S. Appl. No. 13/164,258, filed Jul. 2013, now U.S. Pat. No. 8,495,109, Nathan et al., Downloading File Reception Process.
"About Ecast", date unknown, leaflet.
Austin Cyber Limits: Name That Tune [online], [retrieved Jul. 23, 2001]. Retrieved from the Internet: <http://www.pbs.ork/klru/austin/games/namethattune.html>.

(56) References Cited

OTHER PUBLICATIONS

Back to the Tunes [online], [retrieved Jul. 23, 2001]. Retrieved from the Internet: <http://citc5.hispeed.com/rules.html>.
Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Decision of the European Patent Office to revoke the related EP Patent No. 786 125, Feb. 17, 2005.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
European Search Report from EP 1 993 079.
European Search Report issued for European Application No. 08000845.1-1238/1962251, dated Apr. 3, 2009.
Fachbuch, "Unterhaltungselektronic von A-Z" gfu 1, VDE-Verlag GmbH, pp. 12-13, 1983-1984.
Gallardo et al., "Tangible Jukebox: back to palpable music", ACM TEI, pp. 199-202, 2010.
Gralla, "How the Internet Works", Millennium Ed., Que Corporation, Aug. 1999.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No, 1, Jan. 1998, "Safe Mechanism for Installing Operating System Updates with Applications," pp. 557-559.
International Search Report for PCT/US2009/003998, dated Aug. 17, 2009.
International Search Report for PCT/US2011/22598, dated Mar. 29, 2011.
iTouch 8 Plus brochure, JVL Corporation, 2005, 2 pages.
iTOUCH 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Kozierok, The PC Guide, Site Version 2.2.0, http://www.pcguide.com, Apr. 17, 2001.
Kraiss et al., "Integrated document caching and prefetching in storage hierarchies based on Markov chain predictions", the VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, 2002.
Outlaw, Computer Technology Review, "Virtual Servers Offer Performance Benefits for Network Imaging", 1993.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al., "Information Jukebox A semi public device for presenting multimedia information content", Pers. Ubiquit Comput, 7, pp. 217-220, 2003.
Summary of the oral proceedings regarding EP 786 125 before the Opposition Division of the European Patent Office, Feb. 17, 2005.
Tom & Liz's Name That Tune [online], [retrieved Jul. 23, 2001]. Retrieved from the Internet: <http://home.att.net/~tomnliz/Music.html>.
U.S. Appl. No. 29/371,355, Garneau et al., filed Dec. 14, 2010.
U.S. Appl. No. 61/129,637, Dion, filed Jul. 9, 2008.
U.S. Appl. No. 61/202,617, Dion, filed Mar. 18, 2009.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Written Opinion issued in PCTUS1122598, dated Mar. 29, 2011.

\* cited by examiner

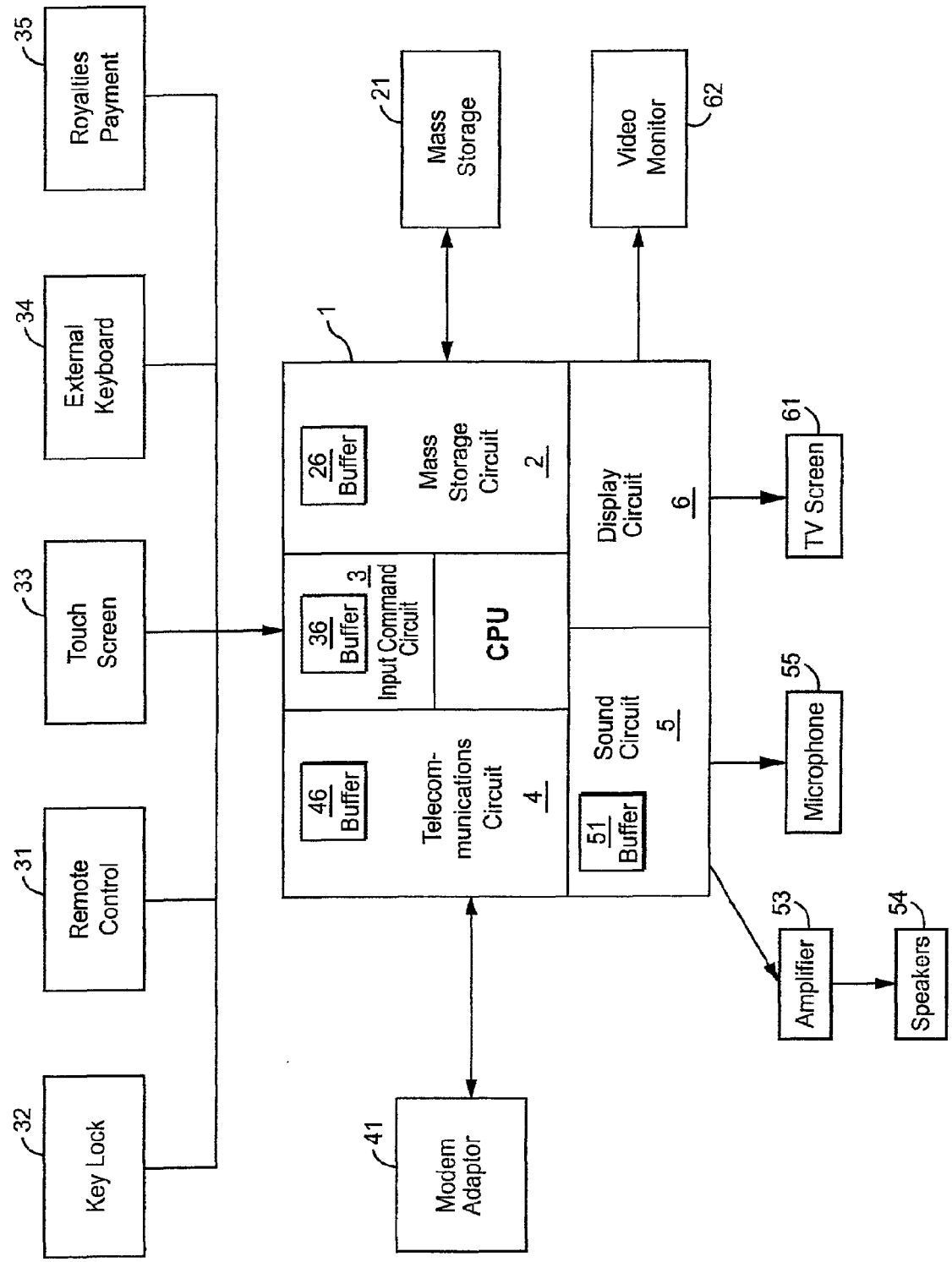

REMOTE CONTROL UNIT FOR ACTIVATING AND DEACTIVATING MEANS FOR PAYMENT AND FOR DISPLAYING PAYMENT STATUS

CROSS REFERENCE TO RELATED APPLICATIONS

This application is a continuation of application Ser. No. 14/064,455 filed Oct. 28, 2013, which is a continuation of application Ser. No. 13/195,168 filed Aug. 1, 2011, which is a continuation of application Ser. No. 11/907,880 filed Oct. 18, 2007, which is a continuation of application Ser. No. 09/357,764 filed on Jul. 21, 1999, which claims foreign priority to French Application No. 9809351 filed Jul. 22, 1998, the entire contents of each of which are hereby incorporated by reference in this application.

FIELD OF THE INVENTION

The present invention relates to a remote control unit for intelligent digital audiovisual reproduction systems, also called jukeboxes.

BACKGROUND OF THE INVENTION

Remote control systems are known in the prior art that use infrared technology to control a device. These systems comprise a transmitter located on the remote control unit and a receiver located on the device. The use of infrared rays requires the transmitter to be pointed towards the receiver on the device.

OBJECT AND SUMMARY OF THE INVENTION

The object of the present invention is to overcome the drawbacks of the prior art by offering a remote control unit that is user-friendly and secure.

This object is achieved by the fact that the remote control unit for intelligent digital audiovisual reproduction systems, comprising storage means, payment means, a sound control circuit and display means, wherein the remote control unit comprises a radio frequency transmitter that is associated with a radio frequency receiver connected to the sound control circuit of the audiovisual reproduction system.

According to another characteristic, the remote control unit has a code that is stored by a learning procedure by the audiovisual reproduction system.

According to another characteristic, at least one audiovisual reproduction system receives a remote control code from the central server that is connected to the reproduction system.

According to another characteristic, a function of the remote control is to disactivate or activate the audiovisual reproduction system and the means of payment.

According to another characteristic, disactivating the means of payment triggers an operator-programmed message to be displayed on the audiovisual reproduction system display means.

According to another characteristic, a function of the remote control enables the audiovisual reproduction system to be credited with a credit equivalent to the selection of at least one song; the maximum number of credits being stored on storage means of the reproduction system.

A second object of the invention is to offer a learning procedure of the code of the remote control unit of the invention using an audiovisual reproduction system.

This object is achieved due to the fact that the learning procedure comprises the following steps: a step in which the audiovisual reproduction, system is set to the learning mode, a step of using the remote control unit close to the audiovisual reproduction system, in this operating mode the audiovisual reproduction system waits for at least one remote control identification code, a step of storing the remote control identification code on the storage means of the reproduction system.

According to another characteristic, the learning mode is included in the operating system of the audiovisual reproduction system.

According to another characteristic, use of the remote control unit causes it to transmit a signal containing an identification code that is contained in the remote control memory.

According to another characteristic, the step of storing comprises the recognition of an identification code in a signal transmitted by the remote control unit.

Other advantages and advantages of the present invention will be better understood from the following detailed description referring to the attached drawing.

FIG. 1 shows a block diagram of an intelligent digital audiovisual reproduction system of the prior art.

DESCRIPTION OF THE PREFERRED EMBODIMENTS

The sole FIGURE shows the audiovisual reproduction system described in international patent application WO 96/12257. Preferably, but in a non-limitative way, this audiovisual reproduction system uses the equipment parts that are numbered and referred to below.

The central processing unit (1) is a system that is compatible with a high-performance PC. An intel pentium-type system that has storage means and the following minimum characteristics should be used to implement the invention: compatibility with the local Vesa bus, processor cache buffer: 256 Kbytes, RAM: 32 Mbytes, high-performance serial and parallel ports, SVGA or similar microprocessor graphic adapter, SCSI/2 or similar bus controller self-powered static RAM.

Any similar CPU with equivalent or better performance characteristics may be used in the invention.

This CPU controls and manages a sound control circuit (5), a telecommunications control circuit (4), an input control circuit (3), a mass storage control circuit (2) and a display means control circuit (6). The display means are mainly composed of a high definition, low radiation, non-interleafed SVGA-type flat screen video monitor (62). This monitor is used to reproduce images, for example the album covers of musical selections, graphics or video clips.

Storage modules (21) are also included as storage means using SCSI-type high-speed, high-capacity hard disks and are associated with the storage means already present in the CPU. These modules are used to store audiovisual information.

A high-speed (28.8 kbps) telecommunications modem (41) adapter is built in to allow connection with an audiovisual information distribution network controlled by a central server.

In order to reproduce the sound information of the musical selections the system comprises loud speakers (54) that receive the signal from a tuner-amplifier (53) connected to a music synthesizer-type electric circuit (5). Said electric circuit is built to accommodate a large number of input sources while having an outlet that provides CD (compact disc)-type quality, such as the sound-card type microprocessor multimedia audio adapter.

Using the input control circuit (3), the audiovisual reproduction system controls a touch screen (33) that includes a panel covering the glass and that uses "advanced surface wave technology" as well as an AT-type bus controller. This touch screen enables various selection information used by the customer to be displayed on the video monitor (62) or on a television screen (61). It also displays management control information used by the manager or the owner of the system. It is also used for maintenance repairs in combination with an external keyboard (34) that can be connected to a system with a suitable keyboard connector controlled by a keyed lock (32) via the interface circuit (3).

The interface circuit input (3) also controls remote control assembly (31).

An audiovisual payment device (35) is also connected to the interface surface input (3). It is also possible to use any other device to receive any method of payment by coins, notes, tokens, chip cards or combinations of methods of payment.

The system is housed in the steel chassis or frame.

In addition to these parts, a cordless microphone (55) is connected to the sound controller (5), which transforms said audiovisual reproduction system into a powerful announcement and information system intended for the public or possibly for a karaoke machine. Similarly, the system can use a cordless loud speaker system.

The remote controlled assembly (31) enables the manager, for example from behind the bar, to access and operate various controls, such as: the microphone on/off control, the loud speaker muting control, the volume control the control for canceling music currently being played.

The operating system has been designed around a library of tools and services that are particularly directed toward the audiovisual field in a multimedia environment. Advantageously, this library includes a high performance multi-task operating system that effectively authorizes the simultaneous implementation of multiple code fragments. Therefore, this operating system is used, in an organized way that avoids any conflict, for rival implementations, operations implemented on display means, sound reproduction means and for controlling telecommunication connections through a distribution network. Furthermore, this operating system is extremely flexible.

The compressed and digitized audiovisual data is stored in storage means (21).

The library of tools and services comprises a first module, referred to as SSM, that is a start-up module for the system. This module only provides a single service, consequently it is automatically charged when the system is powered-up. The system goes directly into the "in service" mode of the module referred to as RMM if the system is started up using a correct recorded number.

The RMM module is the "in service" mode module, the operating mode which the system enters as soon as the recorded number has been validated. In this mode the system is ready to implement any requests that can be triggered by any of a number of predefined operations, such as: customers touching the screen: when a customer or user touches the screen, the system transfers control of the foreground session to the CBSM module that controls the customer selection and exploration mode, the telecommunications network call request server: when the system detects a loop on the telephone line it transmits a background asynchronous procedure: the TSM module telecom service mode, receiving a remote control signal: when an order is received it is processed in a background session by the SMM system control module. However, the foreground session remains available for other operations.

The system remains in the "in service" mode until one of the above-mentioned operations is implemented.

The SMM module is the system control module. The module is used to implement operations that order the system to accept an input requested by a remote control device, these operations being immediately processed without canceling the procedure currently being carried out. A very large number of such operations are possible, of which only a few, non-limitative operations are listed below: volume adjustment of the selections played, volume adjustment of the auxiliary source played, microphone on/off control adjustment of the microphone volume, balance adjustment of left and right channels control of the bass frequency level, control of the treble frequency level, control for canceling or skipping a musical selection track, control for panoramic, zoom in and zoom out effects, triggering of software program reset.

The TSM module is the telecommunications service mode module between the central server and the audiovisual reproduction system. This module is used to control all the control services available on the distribution network. All the telecommunication tasks are controlled as background tasks of the system. These tasks only ever use the processing time that remains once the system has completed all the foreground tasks. Therefore, when the system is busy with a high-priority task, the telecommunication-tasks automatically reduce the demands on the resources of the system and use any processing time the microprocessor leaves available.

The remote control unit according to the invention constitutes the remote control assembly of the audiovisual reproduction system. The remote control unit according to the invention is a remote control unit that uses a radio frequency transmitter. The reproduction system comprises a radio frequency receiver that is advantageously located on the sound control circuit (5). Advantageously, the remote control unit comprises fastening means that connect it to a component, for example the bar, which is not necessarily directed towards the reproduction system. The use of radio frequencies does not require the transmitter to be directed towards the receiver. Therefore, this characteristic avoids any deterioration due to the operations involved in directing the remote control unit toward the audiovisual reproduction system.

The remote control unit has a code in order for an audiovisual system to be customized to a particular remote control. This code is in the form of an address constituted by a DIP switch. When the remote control unit is used the signal it transmits comprises a first data item that contains the code and a second data item that contains the code of the key that has been used. The remote control identification code is stored by the audiovisual reproduction system when the remote control unit is first used, according to a special learning procedure. The procedure comprises several steps.

In a first step the audiovisual reproduction system is set to the learning mode. This learning mode consists in implementing a sub routine of the library of tools and services of the operating system of the reproduction system. This procedure is triggered by lightly touching a special button that is displayed on the screen by the display means. When the operating system is in this mode it is ready to receive a remote control code to allow the reproduction system to only react when the remote control is actuated, following certain operations. Advantageously, the remote control unit comprises a specific key that triggers a signal being transmitted, said signal comprising the code stored in the memory. In a step of using the remote control unit the remote control unit transmits the identification code in the signal when it is used. In a step of storing, the audiovisual reproduction system stores the remote control identification code in its storage means. The learning mode of the reproduction system enables it to recognize and to store the code in the signal transmitted by the remote control unit. At the end of this step the reproduction system returns to the "in service" mode. Therefore, this special learning mode eliminates the need to preprogram the remote control code in the audiovisual reproduction system. Furthermore, once the remote control code has been stored by a reproduction system, every subsequent time the remote control is used, the operating system verifies the identification code of the remote control unit that has just transmitted a signal containing the stored code. If the two codes are identical the function that corresponds to the code of the pressed key will be implemented. If the two codes are not identical there will be no response. Advantageously, the remote control code is stored in an integrated circuit (I button) that is only powered when an operation is implemented and that is capable of storing serial information in a nonvolatile memory.

Advantageously, a second code of a second remote control unit is stored by one audiovisual reproduction system. This second code can be transmitted to each audiovisual reproduction system using the central server and the distribution network to which the audiovisual reproduction system is connected via the telecommunication modem (41).

The remote control unit according to the invention enables certain actions to be implemented on the audiovisual reproduction system using particular keys and functions controlled by the SMM module. A first function, that is effected using a remote control key, is to disactivate the reproduction system and the payment means. Dis-activating the reproduction system prevents any payment means, such as tokens, coins, notes, chip cards etc. from being inserted. Advantageously, the audiovisual reproduction system display screen displays a message while the system is disactivated, for example to inform the user that the audiovisual reproduction system is not available. Advantageously, the message can be operator-programmed by the hirer of the audiovisual reproduction system. The reproduction system and the payment means are also brought back into service using either the same key or a different key on the remote control unit.

A second function of the remote control unit is to be able credit the audiovisual reproduction system with a value equivalent to at least one song. The number of songs is updated each time the second function is used and each time an operator modifies the value of said number. This second function enables, for example, the manager of a bar in which the audiovisual reproduction system is installed to provide his customers with at least one selection without him having to go to the reproduction system and without having to carry out complicated operations.

The remote control unit according to the invention may be seen to be more user-friendly as it is not necessary for it to be pointed towards the audiovisual reproduction system. Furthermore, it is possible for it to be fastened, for example to the bar, thereby avoiding the remote control unit becoming lost or broken. The code learning mode avoids a remote control unit having to be associated with a reproduction system during manufacture in a plant. This simplifies stock management. The additional remote control unit functions also simplify use of the audiovisual reproduction system.

Other modifications available to those skilled in the art can clearly be included in the invention.

What is claimed is:

1. A jukebox system, comprising:
at least one jukebox device, wherein the at least one jukebox device includes a first processing system including at least one processor, a storage device for storing audiovisual information reproducible by the at least one jukebox device in response to user requests, an audio system for playing audio and including a sound control circuit having a radio frequency receiver, a display configured to display video, and a communication system configured to enable the at least one jukebox device to communicate through an audiovisual distribution network; and
a server remote from the at least one jukebox device, the server being configured to provide services to the at least one jukebox device, wherein the server is configured to communicate with each said jukebox device through the network;
wherein each said jukebox device has at least one remote control device associated therewith and configured to communicate through the radio frequency receiver, each said remote control device comprising a second processing system including a processor configured to control the respective remote control device to at least:
store a remote control identification code identifying the respective remote control device; and
transmit a control signal from the respective remote control device to its associated jukebox device, the control signal comprising the stored remote control identification code and a key code corresponding to a controllable feature of the associated jukebox device, wherein features controllable by the control signal include a playback volume of the jukebox device, activation or deactivation of the jukebox device, activation or deactivation of a payment device on the jukebox device, and cancellation of a currently playing song; and
wherein the first processing system of each said jukebox device is configured to control the respective jukebox device to at least:
receive at least one control signal from its associated remote control device, each the control signal comprising a remote control identification code identifying the associated remote control device and a key code corresponding to a controllable feature of the jukebox device;
recognize each said received control signal based on its remote control identification code; and
execute the corresponding controllable feature on the jukebox device based on the key code of each the received control signal after the control signal is recognized.

2. The jukebox system of claim 1, wherein the second processing system of each said remote control device is further configured to control the respective remote control device to transmit a learning signal comprising the stored remote control identification code without a key code, after a predetermined key of the remote control device is actuated.

3. The jukebox system of claim 2, wherein the first processing system of each said jukebox device is further configured to control the respective jukebox device to:
receive a learning signal comprising a remote control identification code without a key code from a remote control device after a learning mode is triggered on the respective jukebox device;

obtain the remote control identification code from the received learning signal; and store the obtained remote control identification code on the jukebox device.

4. The jukebox system of claim 3, wherein the learning mode is triggered by touching a predetermined button on the screen of the jukebox device.

5. The jukebox system of claim 3, wherein the first processing system of each said jukebox device is further configured to control the respective jukebox device to recognize each said received control signal by matching the remote control identification of the control signal with the remote control identification code stored on the respective jukebox device.

6. The jukebox system of claim 1, wherein the controllable feature relates to providing credits to the jukebox device.

7. The jukebox system of claim 1, wherein the controllable feature is on/off control of a microphone.

8. The jukebox system of claim 1, wherein the controllable feature relates to microphone volume control.

9. The jukebox system of claim 1, wherein the controllable feature left/right channel balance.

10. The jukebox system of claim 1, wherein the controllable feature is bass frequency level.

11. The jukebox system of claim 1, wherein the controllable feature is treble frequency level.

12. The jukebox device of claim 1, wherein the first processing system of each said jukebox device is further configured to control the respective jukebox device to display a message after the controllable feature corresponding to the key code of each the received control signal is executed on the respective jukebox device.

13. A method of operating a jukebox device in connection with a remote control device, the jukebox device comprising at least one processor, a sound control circuit having a radio frequency receiver, and a display, the method comprising:

receiving at least one control signal from the remote control device communicated through the radio frequency receiver, each said control signal comprising a remote control identification code identifying the remote control device and a key code corresponding to a controllable feature of the jukebox device, wherein features controllable by the control signal include a playback volume of the jukebox device, activation or deactivation of the jukebox device, activation or deactivation of a payment device on the jukebox device, and cancellation of a currently playing song;

recognizing each said control signal based on its remote control identification code; and executing the corresponding controllable feature on the jukebox device based on the key code of the control signal after the control signal is recognized.

14. The method of claim 13, wherein the controllable feature relates to jukebox device activation/deactivation.

15. A jukebox device having an associated remote control device, the jukebox device comprising:

at least one processor;

a sound control circuit having a radio frequency receiver; and a display;

wherein the jukebox device, under control of the at least one processor, is configured to:

receive at least one control signal from the remote control device communicated through the radio frequency receiver, each said control signal comprising a remote control identification code identifying the remote control device and a key code corresponding to a controllable feature of the jukebox device, wherein features controllable by the control signal include a playback volume of the jukebox device, activation or deactivation of the jukebox device, activation or deactivation of a payment device on the jukebox device, and cancellation of a currently playing song;

recognize each said control signal based on its remote control identification code; and execute the corresponding controllable feature on the jukebox device based on the key code of each the control signal after the control signal is recognized.

* * * * *